United States Patent

Petty, Jr. et al.

[11] 3,850,671
[45] Nov. 26, 1974

[54] PROCESS FOR DRYING AND CRYSTALLIZING COATINGS

[75] Inventors: Eugene D. Petty, Jr., Seaford, Del.; Samuel R. Sberna, Circlesville, Ohio

[73] Assignee: E. I. du Pont de Nemours and Company, Wilmington, Del.

[22] Filed: Sept. 27, 1972

[21] Appl. No.: 292,505

Related U.S. Application Data

[63] Continuation of Ser. No. 713,721, March 18, 1968.

[52] U.S. Cl............ 117/64 C, 117/64 R, 117/65.2, 117/119.6, 117/119.8, 117/138.8 F, 117/161 UF
[51] Int. Cl............................................. B44d 1/44
[58] Field of Search............ 117/119.6, 119.8, 64 C, 117/138.8 F, 64 R, 65.2, 161 UF

[56] References Cited

UNITED STATES PATENTS

| | | | |
|---|---|---|---|
| 3,091,547 | 5/1966 | Jones | 117/119.6 |
| 3,338,736 | 8/1967 | Hain | 117/119.6 |
| 3,398,016 | 8/1968 | Godman et al. | 117/119.6 |

*Primary Examiner*—William D. Martin
*Assistant Examiner*—William R. Trenor

[57] ABSTRACT

A process for drying and crystallizing a polymeric coating deposited from an aqueous system on a heat-sensitive film which comprises drying the coated film by radiant heat while moving it in a counter-current stream of air and thereafter urging the coated surface into contact with a polished heated roll with a nip roll.

5 Claims, 2 Drawing Figures

PATENTED NOV 26 1974

3,850,671

INVENTORS
EUGENE D. PETTY
SAMUEL R. SBERNA

ATTORNEY

PROCESS FOR DRYING AND CRYSTALLIZING COATINGS

This is a continuation of application Ser. No. 713,721, filed Mar. 18, 1968.

BACKGROUND OF THE INVENTION

This invention relates to the application of polymer coatings to self-supporting film substrates and more particularly, it relates to the drying of aqueous coatings and to the subsequent crystallizing of the coatings.

Coating compositions containing vinylidene chloride provide an excellent means for imparting heat sealability and enhanced gas and moisture barrier properties to films such as those of polyethylene terephthalate. Furthermore they provide a good base for printing and marking. For economic reasons, and to minimize fire and explosion hazards, as well as to minimize the pollution of the atmosphere with solvent vapors, it is preferable to apply such coatings from aqueous dispersions rather than from organic systems. But before a suitable level of the desired properties can be achieved in the coating, the coating must be in a substantially moisture free state so that the process of coalescence and crystallization to a dense continuous coating can occur. The phenomena involved in this type of coating are as follows: an aqueous coating is applied to the film, it is dried to an essentially moisture-free state, and then is heated rapidly to complete the coalescence and crystallization. The rapid heating required to crystallize the coating without deformation of the base cannot be achieved unless the coated film is essentially moisture free, since otherwise the evaporation of moisture would result in nonuniform heating and the formation of wrinkles because some areas become dry before others. In the production of thin coated films, and in processes having economically suitable production rates it is very difficult to produce wrinkle-free film which has a uniformly good coating over its entire surface.

In the art it is known to dry aqueous coatings by moving the coated film upward through a vertical drying tower which has internal radiant heat sources and to which a co-current stream of air is supplied at the bottom of the tower. This drying step is effective not only to dry but also to complete the coalescence and crystallization of the coating on films which are not sensitive to heat, since temperatures of the air and the film can become quite high before the film emerges from the top of the tower. As separate areas become dry, the film temperature of that area can rise very rapidly in comparison to most of the film. This is especially true of thin films and can cause wrinkling and other distortions in films which are deformed by heat. Accordingly, while co-current drying and coalescence could be effective for many films, such as regenerated cellulose, the adverse effects accompanying the process make it unsuitable for many thermally sensitive film bases.

In order to minimize the foregoing adverse effects, a process of moving the coated film through a tower having radiant heat sources with a counter-current flow of air has been devised, as described in Goldman and Wallenfels, U.S. Pat. application, Ser. No. 381,624, filed July 10, 1964, now U.S. Pat. No. 3,398,016. Although the process disclosed by that patent application in some situations is free of the foregoing adverse effects, and the disclosure thereof is hereby incorporated by reference, it is ineffectual in achieving the desired degree of coalescence and crystallinity with certain widely used coating compositions. Efforts to post heat the coated film in a free span with more intense radiant heat sources result in excessive deformation of the web before sufficient coalescence and crystallization can be accomplished.

SUMMARY OF THE INVENTION

According to the present invention there is provided a process for drying and crystallizing a polymeric coating applied from an aqueous system to an oriented thermoplastic base film which process comprises advancing the coated film, subjecting the coated film to radiant heat in a stream of air flowing counter-currently to the direction of advancement of the film, while maintaining the film below its deformation temperature, and contacting the coated film with a heated roll having a polished surface, the film being urged into contact with the heated roll at its line of initial contact by an elastomer covered nip roll.

The term "deformation temperature" as used herein is defined as that temperature at which the film without restraint undergoes a change in dimension of at least 1%.

The invention will be described in detail by reference to the drawings.

FIG. 1 schematically illustrates an apparatus for carrying out the present invention.

FIG. 2 shows a plot of the increase in haze of the coated film as a function of the film temperature during the heat treatment on the polished roll.

DESCRIPTION OF THE PREFERRED EMBODIMENT

An essential feature of the present invention is that heat deformable oriented base films should not be exposed to high temperature while in the unsupported condition; specifically unsupported oriented polyethylene terephthalate film should not be permitted to reach temperatures greater than 70°–90°C., otherwise non-uniform heating may occur permitting the formation of wrinkles. Further, the heating step for crystallization should be initiated across the width of the film simultaneously and uniformly, otherwise wrinkles or other distortion of the film may occur. Thus the coated film is dried first by radiant heat in a counter-current stream of air. The film is not allowed to reach its deformation temperature during this operation. To attain the outstanding barrier properties, adhesion and solvent resistance, attendant in the properly crystallized coating, the film is then rapidly heated in a fully supported state on a polished roll. This rapid heating cannot be achieved, however, unless the film is substantially moisture-free by the time it contacts the heated roll. Uniform heating across the width is not readily achieved by simple wrapping of the film around the hot roll since an air layer entrained by the film prevents good heat transfer. To assure the attainment of this requirement of rapid uniform heating, the present invention provides a nip roll to urge the coated film into intimate contact with a hot roll at its line of initial contact. The nip roll is preferably covered with a resilient material.

Figure 1:
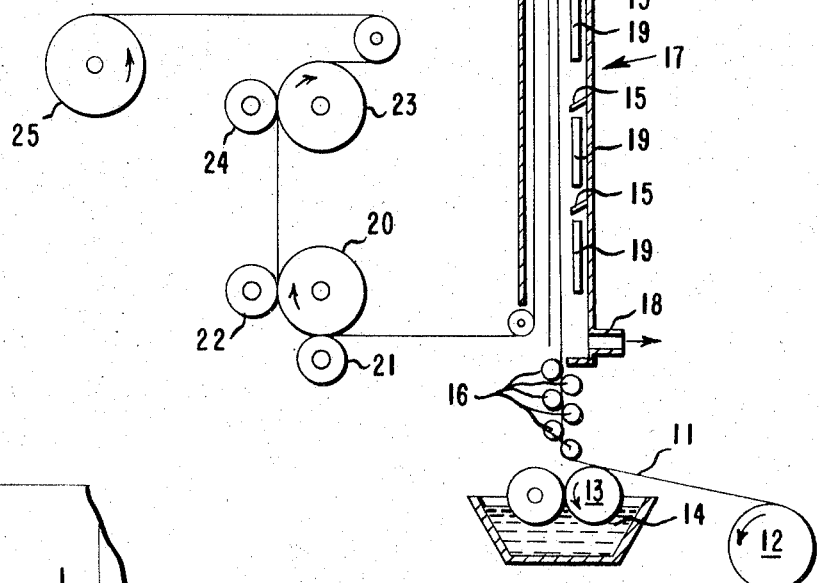

Referring to FIG. 1 film 11 is advanced from supply roll 12 over doctor roll 13 which is immersed in the aqueous dispersion of the polymeric coating 14. The film 11 is coated by kiss-coating, as is known to the art. The film containing a water-web coating then passes over smoothing rolls 16 and thence into drying tower 17. After entering the upper end of the tower air is withdrawn through port 18. The air thus flows in a direction opposite to that of the coated film which moves upward. The film is heated in the tower by radiant heaters 19 which may comprise any one of the conventional radiant heaters. Baffles 15 are provided to prevent excessive cooling of radiant heaters 19 by the air stream. In case the base film is biaxially oriented polyethylene terephthalate its temperature is allowed to reach about 60°C. to 70°C. and the velocity of air is usually 100 to 500 yards per minute for film velocities of 167 to 350 yards per minute. The passage of the coated film through the drying tower removes substantially all of the water from the coating. After the dry coated film emerges from the drying tower in which the coating is coalesced, it is further advanced to the polished heated roll 20 where crystallization of the coating is completed. The dry coated film contacts the polished surface of heated roll 20 against which it is urged at its line of initial contact by elastomeric covered nip roll 21. It remains in contact with this roll through a partial wrap of the roll to optional exit nip roll 22, which is also an elastomer covered roll. Optionally, quench roll 23 may be applied combined with an elastomeric covered nip roll 24 to cool the film to ambient or storage temperature before winding on windup roll 25.

The temperature of crystallizing roll 20 is maintained by internally circulated heated fluids, or by internal electrical heaters. For vinylidene chloride type coatings on oriented, heat-set polyethylene terephthalate base film the temperature of this roll should be at least 90°C. and preferably it should be maintained between about 115°C. to 120°C. (e.g., by circulating heated fluids, e.g., steam, through its interior).

In passing between heated roll 20 and nip rolls 21 and 22 the film undergoes instantaneous and uniform heating. By virtue of heating the entire width of the sheet instantaneously and to the same temperature, while supporting the film under at least partial restraint in its contact with the elastomeric covered nip rolls, any film shrinkage is uniform across its width, avoiding wrinkling and heat deformation. An essential feature of the crystallizing step is the ironing action of the nip roll 21 at the initial contact line across the heated roll 20 removing the entrained air which would otherwise prevent adequate and uniform heat transfer.

The desirability of chill roll 23 and its associated nip roll 24 is a function of the extent to which the film and its coating can be cooled before windup. It should be recognized that if the film is wound on the roll at a temperature which is significantly higher than the temperature at which the roll will be stored, normal thermal shrinkage will cause adverse effects on the roll. Therefore, it is often preferred to provide this additional cooling means. For this purpose a cooling fluid, e.g., water, at 20°–25°C. is circulated through the interior of this roll.

For attainment of high speeds it is essential that the counter-current air flow in drying tower 17 be at a velocity between about 100 and 500 yards per minute and preferably between 200 and 350 yards per minute. Higher air velocities cause the film to flutter badly in the drying zone whereas too low an air velocity is inefficient in moisture removal.

The lower air velocity limit may differ somewhat for different films and coatings depending on such factors as the dimension of the tower, characteristics of the particular film, the water content of the coating and the temperature of the air being supplied to the coating tower. The important consideration is that the countercurrent flow of air must be supplied at such a rate that the deformation temperature of the film is not reached.

In the embodiment depicted in FIG. 1 it is the uncoated surface of the film that contacts the heated roll. The process could also be carried out by urging the coated surface against the heated roll. The only criterion that must be met is that the coating reach the 110°–120°C. range. For thicker films (e.g. 0.001 to 0.010 inch) this can be done most conveniently by having the dry coating touch the hot roll. For very thin films (such as 0.001 inch and thinner) the coating will reach the desired temperature no matter which side touches the roll. Therefore, to help maintain cleanliness during upsets when the film arrives still wet, it is preferred that the uncoated side touch the hot roll.

The process of this invention can be used for coating a variety of heat sensitive thermoplastic films including those normally considered as being dimensionally stable or heat set but which are thermally sensitive to a degree, as well as the so called heat shrinkable films, i.e., films which will shrink at least 10% upon immersion in boiling water. Representative thermoplastic films usefully coated according to this invention include those of oriented polyolefins such as polyethylene and polypropylene, oriented polyethylene terephthalate, oriented polycarbonates, and other oriented thermoplastic films which require solvent resistant coatings applied from aqueous dispersions. The more heat sensitive films require a commensurate reduction in the temperature they are exposed to during the process of this invention.

The aqueous coating materials are those known in the art and include vinylidene chloride copolymers, for example, vinylidene chloride/methyl acrylate/itaconic acid terpolymer, other copolymers of vinylidene chloride with acrylic and methacrylic acid esters, with acrylonitrile, methacrylonitrile, terpolymers of such copolymers with acrylic and methacrylic acids, and the like. These copolymers should contain at least about 85% vinylidene chloride. Otherwise, they cannot be readily crystallized to provide a satisfactory moisture barrier. Ordinarily, aqueous dispersions of about 15% to 65% solids content will be used, preferably of 42% to 45% solids content which yields a dry coverage of $4.0 \pm 0.5$ g/m² coating, but no limitation on the present invention is intended in this regard.

The present invention is further illustrated by the following examples wherein all parts and percentages are by weight.

EXAMPLE 1

Oriented polyethylene terephthalate films, of 0.0005 inch thickness are coated in a continuous process (i.e., the coating, drying and crystallization steps are conducted without interruption or rewinding between steps) with an aqueous dispersion of vinylidene chloride, acrylonitrile, and itaconic acid in the ratio of 90/10/1, respectively, with 42% solids in the dispersion. The process is modified so that separate samples are handled differently: a first sample is dried in a co-current air stream, cooled on chill rolls and wound; a second sample is dried in a counter-current air stream, cooled and wound; and a third sample is dried in a counter-current air stream, crystallized by a hot roll against which its uncoated surface is urged by a rubber-covered nip roll, cooled and wound. As a test of crystallinity each sample is tested by placing a drop of "Cellosolve" (Union Carbide Corp. trademark for ethylene glycol monoethyl ether) on the coating and measuring the time until the resulting spot becomes hazy as observed by the eye. Haze is indicative of dissolution of the coating and lifting from the base film surface. Dissolution time is a function of crystallinity. More completely crystallized coatings give larger dissolution times. Conditions and results are summarized in the following table.

hot roll 20. Areas within adjacent wrinkles are found to be poorly crystallized as revealed by the above described "Cellosolve" resistance test and wet-stretch haze test.

What is claimed is:

1. In a continuous process for drying a coalescible vinylidene chloride copolymer coating applied from an aqueous system to an oriented polyethylene terephthalate film base which process comprises:

a. advancing the coated film; and b. drying the coated film until it is in a substantially moisture-free state by subjecting the coated film to radiant heat in a stream of air flowing countercur-

| Sample | Film Speed yds/min | Tower Air | Tower[1] Time sec. | Tower[1] Temp. °C. | Hot Roll Time sec. | Hot Roll Film Temp. °C. | Film Cond. | Haze Time sec. |
|---|---|---|---|---|---|---|---|---|
| 1 | 200 | co-current | 3.4 | 90 | none | | Wrinkled | 5 to 10 |
| 2 | 250 | counter current | 2.72 | 70 | none | | Smooth | <5 |
| 3 | 250 | counter current | 2.72 | 70 | 0.35 | 115 | Smooth | >10 |

[1] The film is heated by electric radiant heaters disposed adjacent and parallel to the coated side of the film; the time is that portion of the transit time which the film spends in the heated zone of the tower, i.e., 34 feet. Temperatures of the film are measured by an "Optitherm" (Barnes Instrument Co.). Air is drawn into the tower at the respective locations at ambient temperature.

EXAMPLE 2

Figure 2:
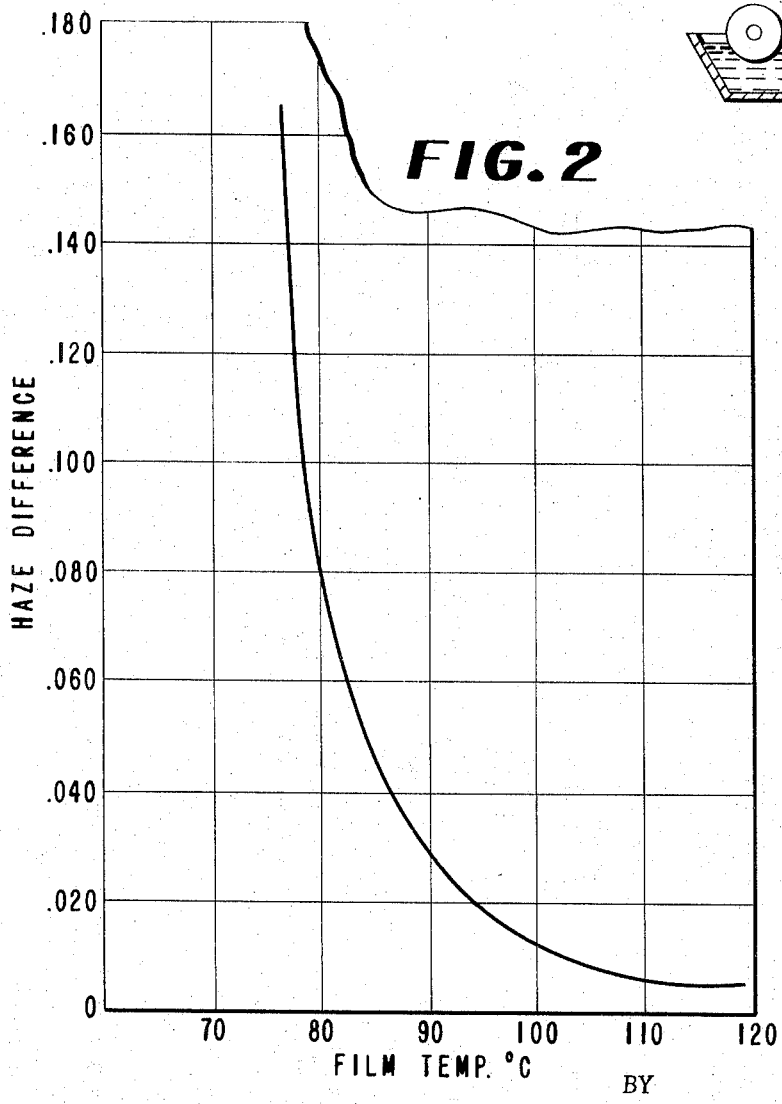

To illustrate the significance of the hot roll crystallization treatment of the present invention, coatings are applied to 0.0005 inch thick biaxially oriented polyethylene terephthalate film as in Example 1 except in a discontinuous process. The coating is dried in a tower at 200 yards per minute with a counter-current stream of air heated with radiant heat so that the maximum film temperature is 70°C.; the coating is free from moisture on emerging from the tower. The coated film is wound on rolls. It is crystallized at 60 feet per minute by contacting it with a hot roll for 0.498 second, with a nip urging the uncoated surface into contact with the polished surface of a crystallizing roll, the temperature of which is varied with separate samples from 90°C. to 120°C. The relative degree of crystallinity is indicated by the following procedure: the initial haze of the dry coated film is measured with a Gardner haze meter, the sample is immersed in water, removed, stretched 5% while wet, and the haze measured again. A small increase in the haze is indicative of a high degree of crystallinity, which is known to result in good moisture barrier characteristics. Haze increase as a function of film temperature on the crystallizing roll is shown in FIG. 2. It can be seen that to be effective the temperature of the film and thus the temperature of the crystallizing roll should be at least 100°C., preferably at least 115°C. In this region essentially no haze increase occurs indicating high moisture permeability.

Tests run without the nip roll 21 result in excessively wrinkled film caused by nonuniform contact with the rent to the direction of travel of the advancing film, while maintaining the film at a temperature of about 60° to 90°C.;

the improvement wherein the vinylidene chloride copolymer coating is then crystallized, without distortion of the polyethylene terephthalate film, by c. contacting the dried coated film with a roll having a polished surface and heated to a temperature of about 115° to 120°C. wherein said film is urged into contact with said heated roll at its line of initial contact by an elastomer-covered nip roll for a period of time sufficient to heat the coating to a temperature of about 110° to 120°C.

2. The process of claim 1 wherein the coated film is cooled after it has contacted the heated roll.

3. The process of claim 1 wherein the coated film is advanced at a film velocity of about 167 to 350 yards per minute and the coated film is dried by subjecting the advancing film to radiant heat in a counter-current stream of air having a velocity of about 100 to 500 yards per minute for a time sufficient to heat the film to about 60° to 70°C.

4. The process of claim 1 wherein the film base is coated on one side only and the uncoated side of the film base is urged into contact with the heated roll.

5. The process of claim 1 wherein the aqueous polymeric coating composition is an aqueous dispersion of 15 to 65 weight percent solids of a vinylidene chloride copolymer containing at least 85 weight percent vinylidene chloride based on the weight of solids present.

* * * * *